United States Patent Office 3,438,564
Patented Apr. 15, 1969

3,438,564
CONTAINERS
Douglas Arthur Moreton, Braeside, Wormald Green, near Harrogate, England, assignor to Alf Cooke Limited, Leeds, Yorkshire, England, a British company
Filed Feb. 1, 1967, Ser. No. 613,270
Claims priority, application Great Britain, Feb. 4, 1966, 5,109/66
Int. Cl. B65d *5/00, 5/66*
U.S. Cl. 229—16                               5 Claims

ABSTRACT OF THE DISCLOSURE

A blank to be folded into a carton or box, the blank consisting of a flat sheet creased, scored or otherwise weakened along lines such that it can be folded into a rectangular closed box or carton having front and back panels joined by a base wall, overlapping side walls, three essentially triangular gussets, on each side, joined to one another and extending respectively from the free edge of the base wall and from the two adjacent edges of the side walls, the gussets being arranged to be folded into packs lying against the inside surface of the container, and panels arranged to be folded so as to provide a lid hinged to the back wall.

---

This invention relates to containers, such as cartons or boxes, that can be completely closed and are made from single blanks of cardboard, paperboard, or other foldable material.

According to the present invention, the edge of the front panel remote from the base panel is extended by a panel providing the top of the lid and by a panel and lid sides providing a lid skirt, means being provided for holding the lid sides in position to close the sides of the lid.

Cartons made from the blanks aforesaid need not have pinholes, that is minute openings, at any of the eight corners and are considerably strengthened by the packs of gussets. They can be sealed by thermoplastic adhesive or by mechanical means. The thermoplastic adhesive may be applied to one side of the blank only and, due to the external pressure that may be applied as a result of the physical properties of the carton, can be made to give good fibre-tearing seals, even when the thermoplastic medium employed is polythene coated overall to the inside surface.

Figure 1:
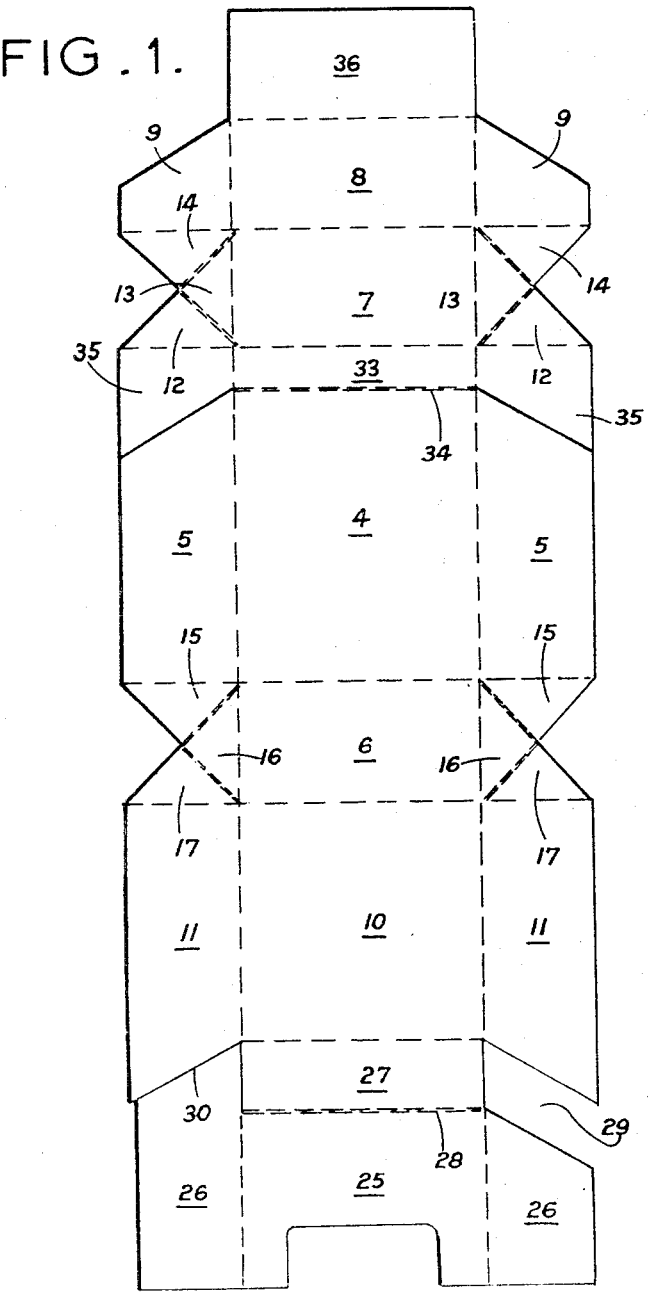
Figure 2:
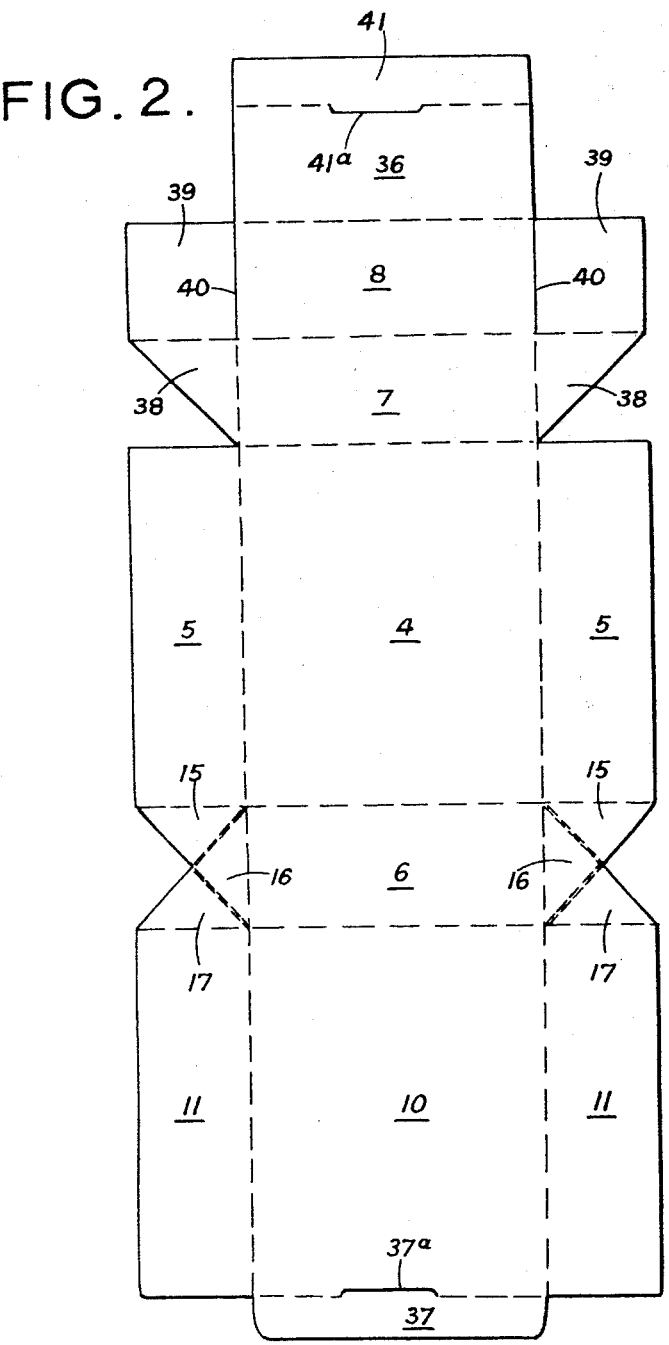
Figure 3:
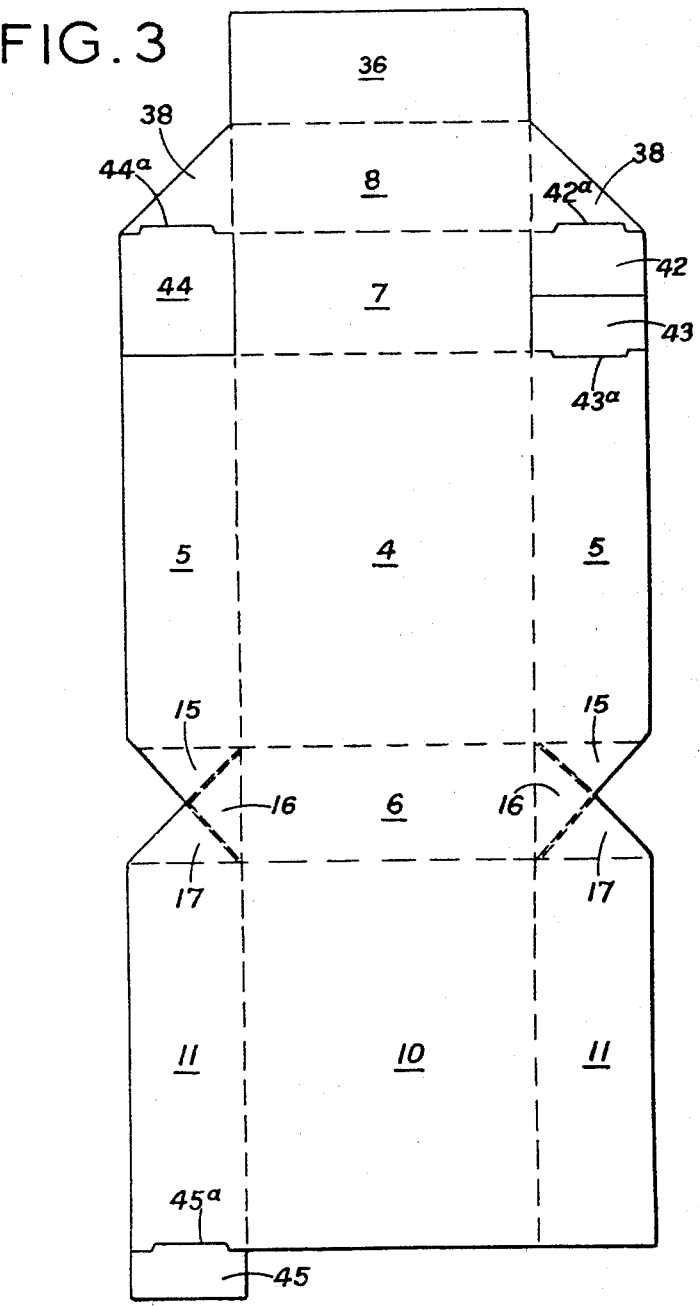
Figure 5:
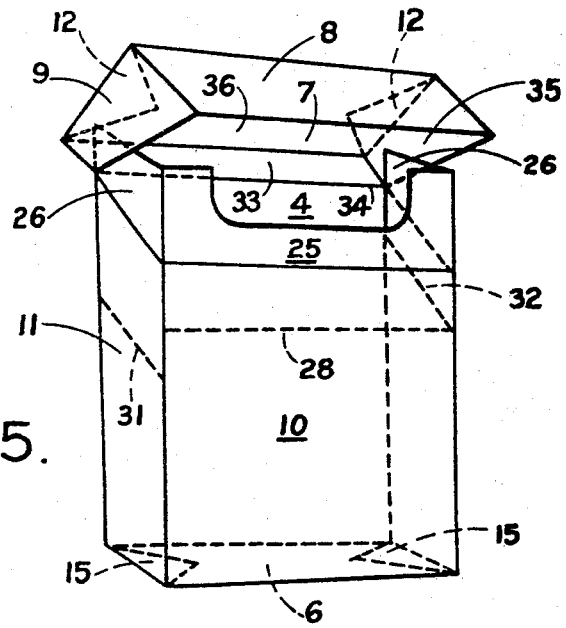
Figure 6:
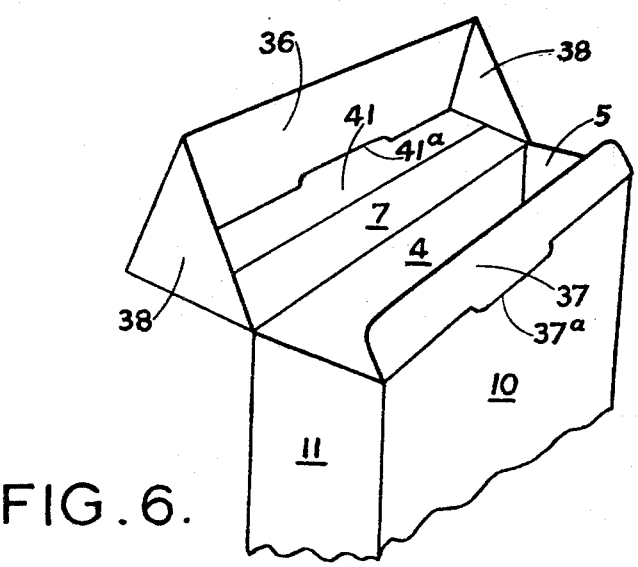
Figure 7:
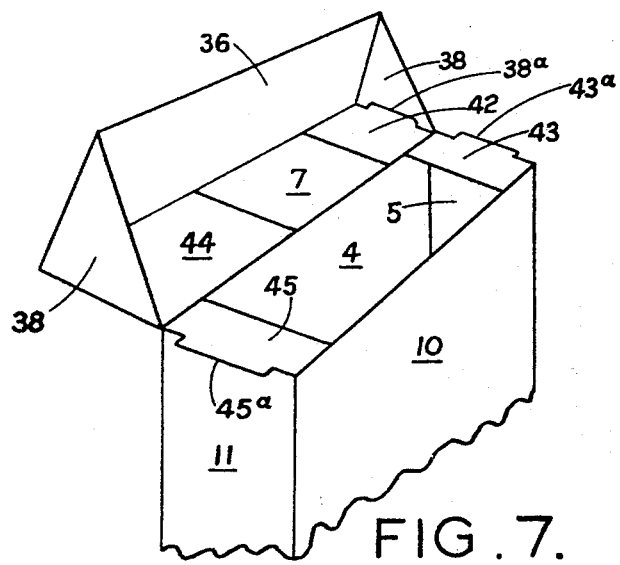
Figures 8, 9:
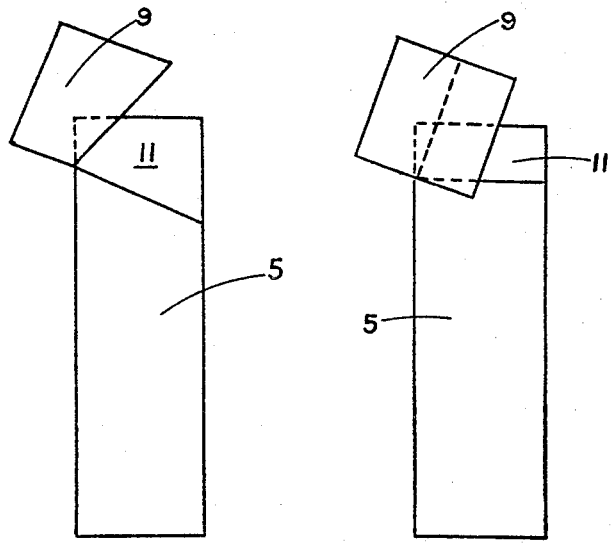
Figure 10:
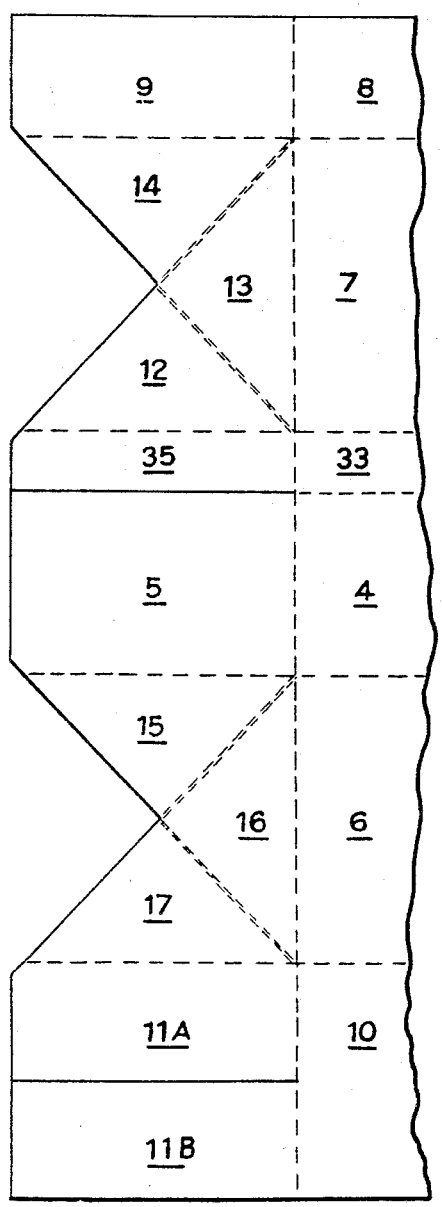
Figure 11:
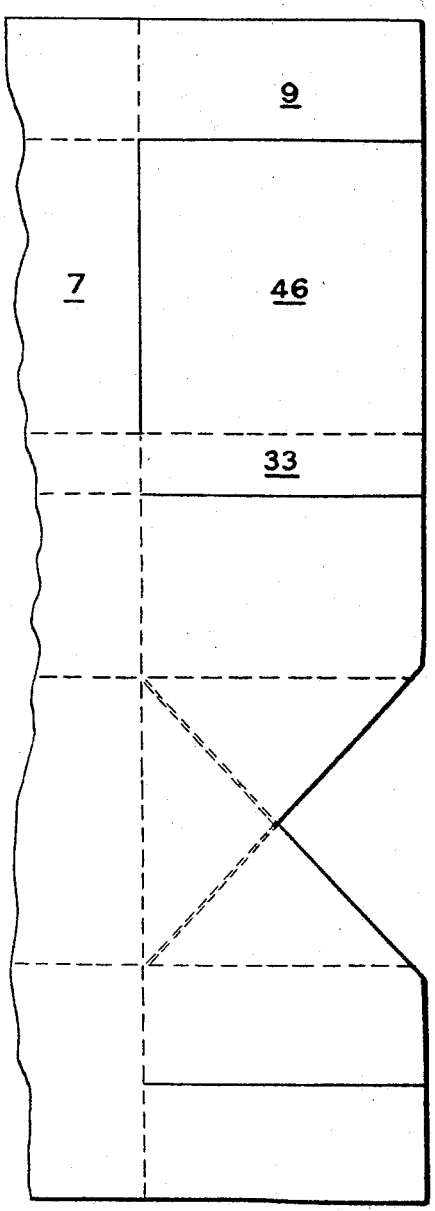
Figure 12:
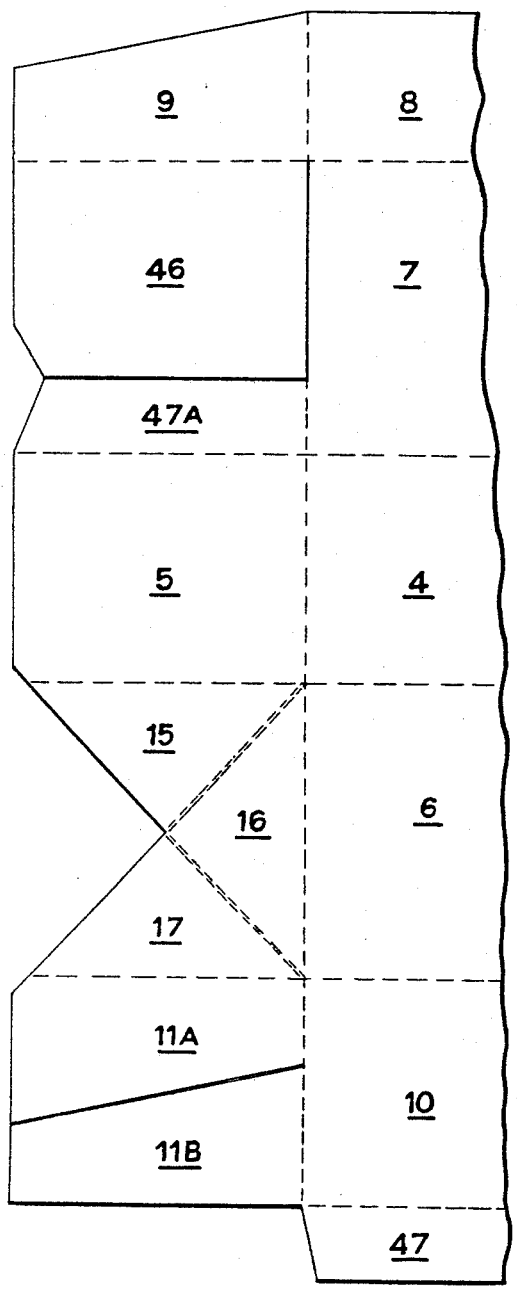
Figure 13:
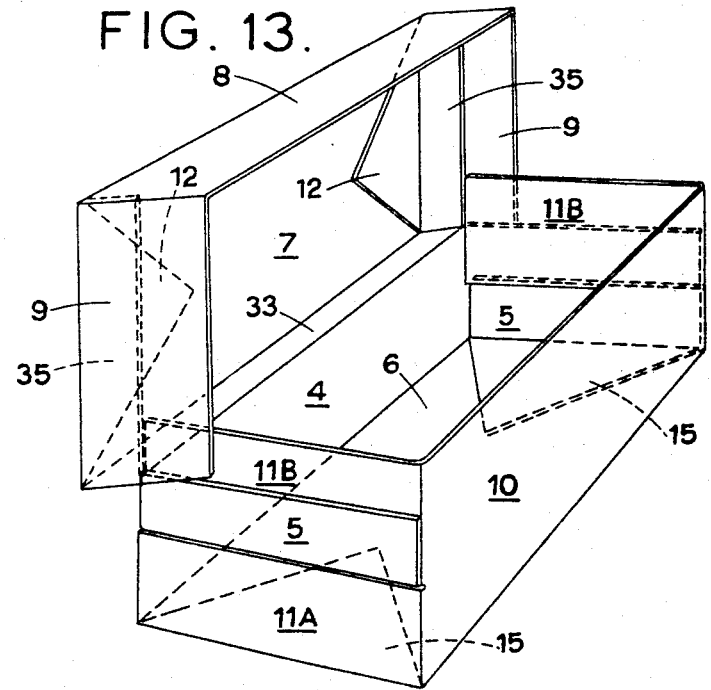
Figure 14:
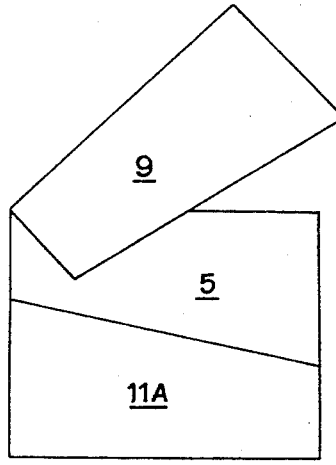
Figure 15:
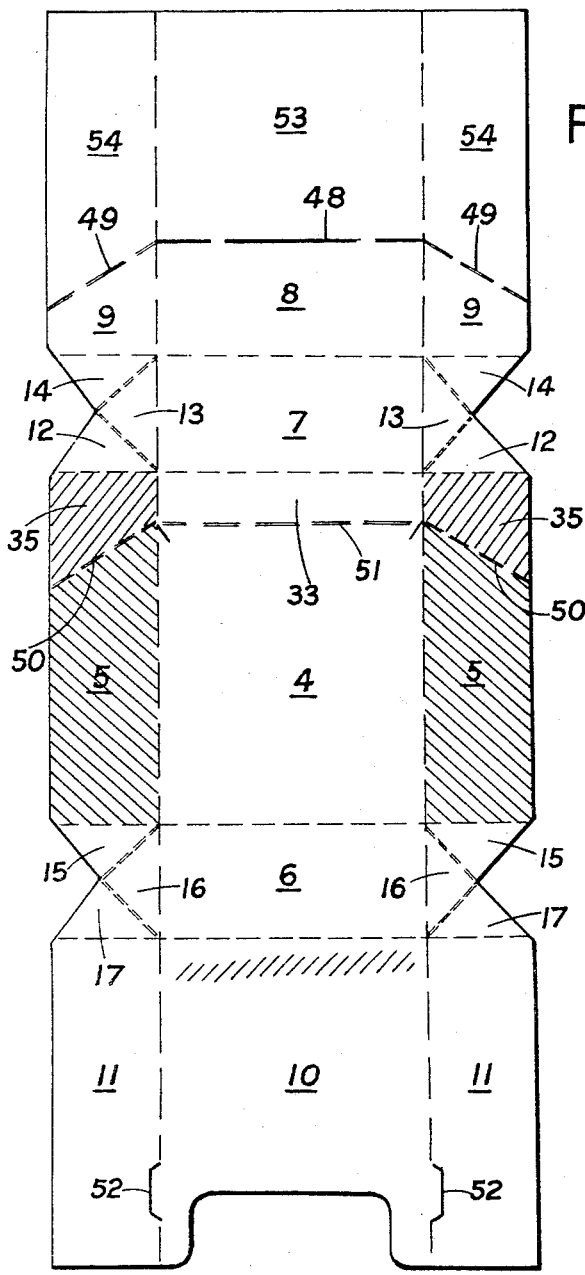
Figure 17:
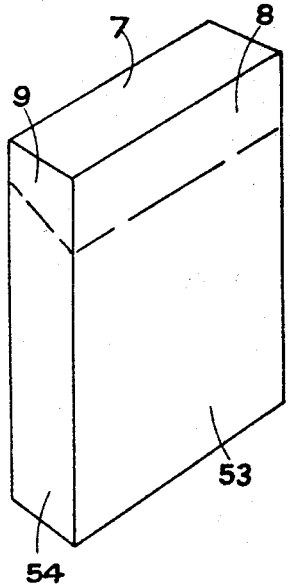
Figure 16:
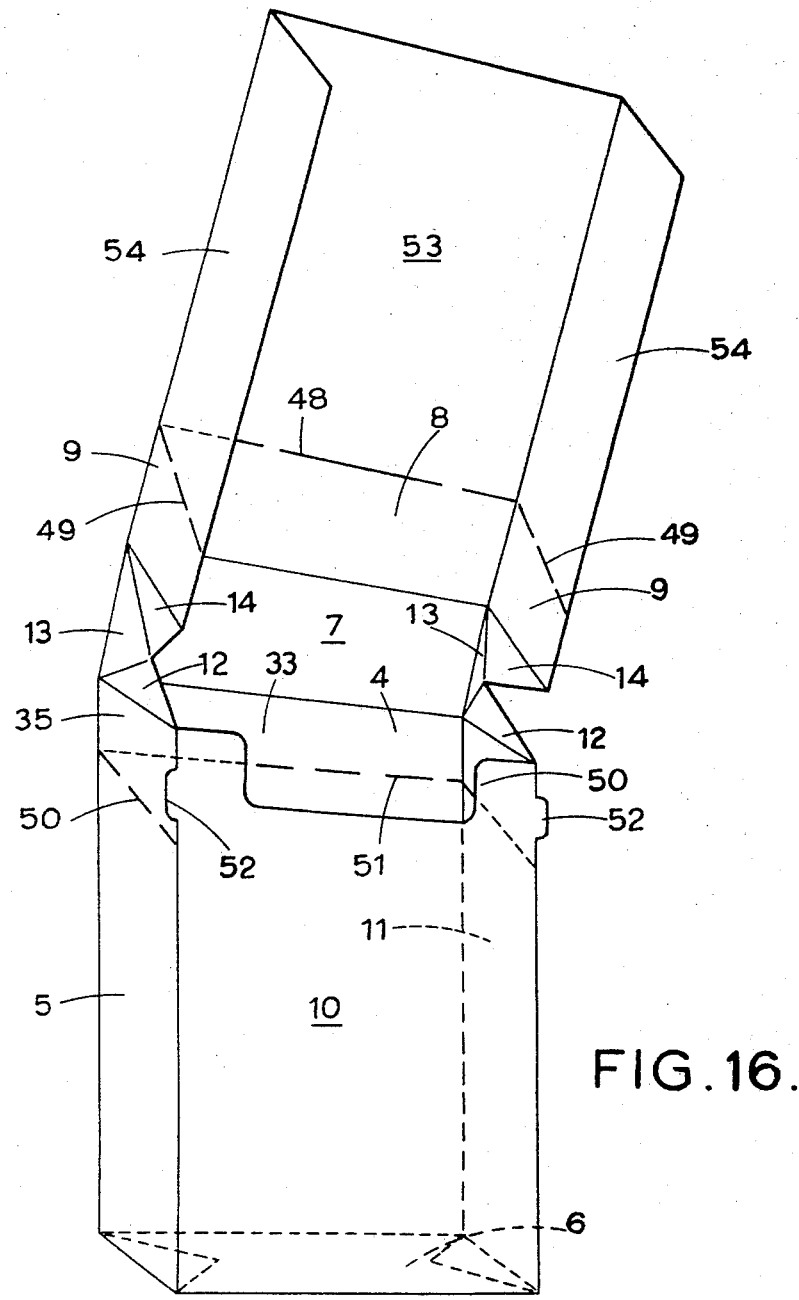

In order that the invention may be clearly understood and readily carried into effect, some carton blanks and cartons made therefrom, and methods of making such cartons, will now be described, by way of example, with reference to the accompanying drawings, in which:

FIGURES 1 to 4 respectively show plans of four carton blanks,

FIGURE 5 is a perspective view of a carton formed from the blank of FIGURE 1,

FIGURE 6 is a perspective view of the top of a carton formed from the blank of FIGURE 2, FIGURE 7 is a perspective view of the top of a carton formed from the blank of FIGURE 3, FIGURES 8 and 9 are respectively opposite side views of a carton formed from the blank of FIGURE 4, FIGURES 10, 11 and 12 respectively show portions of three further carton blanks, FIGURE 13 is a perspective view of a carton formed from the blank of FIGURE 10, FIGURE 14 is a side view of a carton formed from the blank of FIGURE 12, FIGURE 15 is a plan of another carton blank, FIGURE 16 is a perspective view of a carton partially completed from the blank of FIGURE 15, and FIGURE 17 is a perspective view of the carton of FIGURE 16 when fully completed.

In each of the blanks shown in FIGURES 1, 2, 3, 4, 10, 11, 12, 15 the broken lines represent lines along which the blank is creased, embossed or otherwise weakened so as to be folded along these lines, the double broken lines representing folds that are effective in the convex sense when the other folds are effected, in the completed carton, in the concave sense. The full lines and thickened broken lines represent slits, except where the lines obviously represent shading.

Each of the blanks is arranged to be folded into a carton having a hinged lid. For example, the blank of FIGURE 1 is adapted to produce a carton as shown in FIGURE 5. Moreover, each blank incorporates a base panel 6 that constitutes the bottom wall of the completed carton, and this panel 6 is interposed between a panel 10 providing the front of the carton and a back panel 4. Each blank is provided also with side panels 11 on opposite sides of the front 10 and with side panels 5 on opposite sides of the back 4. In the completed carton, the side panels 5, 11 lap one another. In addition, each blank has a panel 7 to provide the top of the lid, and a panel 8 and tabs 9 to provide the lid skirt. Each side panel 5 is joined to the adjacent side panel 11 by three triangular gussets 15, 16, 17 joined to one another and having their bases respectively joined to and coextensive with the side panel 5, the base panel 6 and the side panel 11. When the carton is erected, each set of gussets is formed into a triangular pack lying flat against the inside surface of the base panel 6. Thus, the gusset 16 is folded against the base panel 6, and the gusset 17 between the gussets 16, 15 if the side panel 11 is to lap outside the side panel 5 as in FIGURES 1 and 5. If the side panel 5 is to lap outside the side panel 11, the gusset 15 lies between the gussets 16, 17.

Referring now in detail to the blank of FIGURE 1 and corresponding carton of FIGURE 5, this carton incorporates an integral neck having a front panel 25 and side panels 26 projecting above the front 10 and sides 11. The neck front 25 is joined to the front 10 by an intermediate panel 27 which, in the completed carton, is folded down against the inside surface of the front 10, the neck front 25 then being folded upwards about a line 28 (FIGURES 1 and 5). Two small alternative variations are shown respectively on opposite sides of FIGURE 1. Thus, on one side there is a notch 29 and on the other side a simple slit 30, resulting in the lower edges of the neck sides 26 appearing at 31 and 32 in FIGURE 5. In practice, only one of these alternatives would be used in the single carton.

The lid has a back wall 33 hinged by means of a crease or similar weakened line 34 to the back 4. At each side of the lid back 33 are inner lid sides 35, each of which in the completed carton is located face to face with the adjacent outer lid side 9, three associated gussets 12, 13, 14 being folded in a pack against the lid top 7. These gussets behave similarly to the gussets 15, 16, 17, the gusset 13 folding against the inside surface of the lid top 7 and the gusset 14 between the gussets 12, 13. A flap 36 is folded against the inner face of the lid front 8 so as to give extra strength and avoid a cut or raw edge at the front of the lid.

Adhesive, such as glue or a thermoplastic, may be applied in a variety of ways; for example, between each pair of side panels 5, 11, between each outer and inner lid sides 9, 35 and between the flap 36 and lid front 8.

In the variation shown in FIGURES 2 and 6, the neck is replaced by a simple flap 37 at the top of the front 10. The lid sides are simple triangular panels 38 that are folded at right angles to the lid top 7. Tabs 39, extending from the sides 38, are separated from the lid top 8 by slits 40. The tabs 39 are bent at right angles to the lid sides 38 and are sealed against the lid front 8 by the flap 36, which has an extension 41 sealed against the lid top 7. The junction between the front 10 and flap 37 contains a slit forming a shallow lip 37a which projects outwards from the carton and snaps into a slot in the lid when the carton is closed. This slot is formed by a reverse lip 41a between the extension 41 and the flap 36. The reverse lip 41a moves slightly to evacuate the slot when the extension 41 is applied to the lid top 7. This catch arrangement may be used a number of times without detriment to the carton. The carton is opened either by pushing the lid up or by pressing in the front of the carton to make the lid fly up automatically.

FIGURES 3 and 7 show a variation of the carton of FIGURES 2 and 6, in which the triangular lid sides 38 are extensions of the lid top 8 instead of the lid front 7. It will be seen that the blank of FIGURE 3 is shown with sides that are slight variations of one another. In practice, either of these variations would be used in duplicate but in FIGURE 7 both are shown. Thus, on one side the lid side 38 has a shorter tab 42, leaving room for a flap 43 on the side panel 5 at that side, while on the other side the lid side 38 has a longer tab 44 extending to the adjacent side panel 5. In the completed carton the flap 43 projects inwards at the top. On the other side, the equivalent flap 45 projects inwards from the side panel 11, instead of the panel 5. The tabs 42, 44 are sealed to the inner face of the lid top 7. It will be seen that lips 42a, 43a, 44a, 45a are provided to latch the lid in the closed position, as in the arrangement of FIGURES 2 and 6 but in this case the latching takes place at the sides instead of at the front of the carton.

Figure 4:
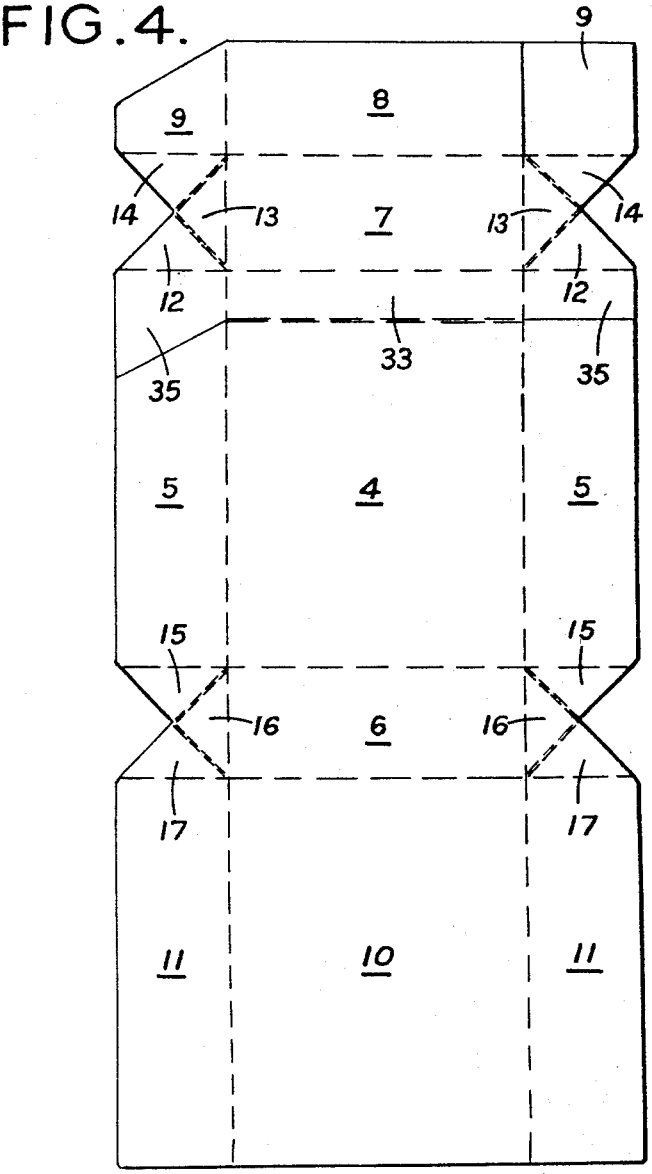

FIGURES 4, 8 and 9 show a simplification of FIGURES 1 and 5, in which the neck and flap 36 are omitted. Moreover, FIGURE 4 shows two alternative possibilities for the inner lid sides 35. In erecting the carton, the side panels 11 may either be located inside or outside the side panels 5. If the panels 11 are inside, fewer cut or raw edges are exposed. In this case, the front and sides of the body of the carton may be debossed to accommodate the front and sides of the lid. FIGURES 8 and 9 show the case where the side panels 5 are outside the panels 11, these figures respectively showing the appearance of the alternative sides of FIGURE 4. In each case, in the closed carton, the lower edge of the inner lid side 35 butts against the top edge of the associated side panel 5.

FIGURES 10 to 14 are concerned with rather more squat cartons or boxes than those to which FIGURES 1 to 9 relate. However, the lid structures remain similar. In fact the lids of FIGURES 10, 12 and 13 are essentially the same as those of FIGURES 1, 4, 5, 8 and 9. The important differences are to be found in the carton bodies or trays. Thus, each side panel 11 is divided into two parts 11A, 11B, arranged so that, in the folded carton, the panel 5 lies outside the part 11A, and the part 11B lies inside the panel 5. The dimensions of these members are such that, on each side, the side panel 5 projects above the part 11A and the part 11B projects above the side panel 5, so that in the closed carton, the lower edge of the outer lid side 9 abuts against the top edge of the part 11A, the lower edge of the inner lid side 35 abuts against the top edge of the panel 5, and the lid top 7 against the top of the part 11B, insofar as the precision of the manufacturing process permits these engagements to take place simultaneously. The lid front 8 overhangs the tray front 10 but the front 10 may be debossed to provide a flush fit.

FIGURE 11 shows a modification of FIGURE 10, in which the gussets 12, 13, 14 are replaced by a simple panel 46 which is folded at right angles to the inner lid side 33 and secured by adhesive against the inside surface of the lid top 7.

A rather similar arrangement is shown in FIGURE 12 but, in this case, the lid has no back wall and is hinged directly to the tray back wall 4. Moreover, on each side, the top of the part 11B is flush with the top of the side panel 5 (FIGURE 14). As the part 11B is not exposed, it may be truncated or omitted as desired. The top of the part 11A is inclined as shown, and the lower edge of the tray side 9 is similarly inclined to fit. The tray front wall 10 is furnished with a flap 47. The top of each side panel 5 is also furnished with a flap 47A. The panel 46 is folded at right angles to the lid side 9 and to the lid front 8 and is sealed to the lid top 7.

FIGURE 15 shows a modification of the arrangement of FIGURES 4 and 8, in which the lid skirt 8, 9 is extended by panels 53, 54 separated from the skirt 8, 9 by lines of slits 48, 49. Similar lines of slits 50 separate the inner lid sides 35 from the side panels 5. The side panels 11 are folded inside the side panels 5. Then the extended lid skirt 8, 53, 9, 54 is folded down through the position of FIGURE 16 to that of FIGURE 17, in which the extension panel 53 covers the front panel 10 and in which the extension panels 54 and outer lid sides 9 cover the side panels 5 and the inner lid sides 35. In this example, the extended lid skirt 8, 53, 9, 54 is sealed in position by thermoplastic adhesive applied to the shaded areas on the side panels 5 and inner lid sides 35, as shown in FIGURE 15, which shows the outer face of the blank. However, the actual opening of the carton to expose the contents, such as cigarettes, is not effected by raising the whole extended lid but by splitting it along the lines of slits 48, 49 separated by catch points, the inner lid sides 35 simultaneously being separated from the side panels 5 along the lines of slits 50. The lid comprising the top 7, the skirt 8, 9 with the inner skirt sides 35, and the lid back 33, can then be opened by bending it back about the crease 51.

The shaded area on the front panel 10 indicates additional thermoplastic adhesive for securing the lid extension 53.

Slits in the side panels 11 form lips 52 that project outwards as shown in FIGURE 16 to act as catches for the lid when once it has been separated by splitting along lines 48, 49, 50.

The packs of triangular gussets 12, 13, 14 and 15, 16, 17 are packed against the lid top 7 and the base 6, so as to give additional strength and protection and eliminate pinholes at the corners. Thus, the completely sealed carton, made from one piece, does not require additional wrapping.

It will be seen that each set of gussets 12, 13, 14 and 15, 16, 17 defines a V-shaped notch. It is, however, advantageous, in some circumstances, for this notch to be filled in by an extension of one only of the gussets 12, 14 or 15, 17, so as to provide a blank that is uniform along the side edges.

I claim:
1. A single, flat blank for the formation of a container furnished with an integral lid, the blank being creased, embossed or otherwise weakened along lines that divide the blank into areas including a base panel interposed between a front panel and a back panel, first side panels on opposite sides of the front panel, and second side panels on opposite sides of the back panel arranged to lap the first side panels in the completed carton, three essentially triangular gussets at each side of the base panel connecting the edges of the adjacent first and second side panels and the base panel and foldable into a pack lying flat against the inside surface of the base panel; and a lid structure comprising a lid back extending from the edge of the back panel remote from the base panel, a lid top extending from the edge of the lid back remote from the back panel, a lid front and outer lid sides providing a lid skirt extending downwards from the lid top in the completed carton, the lid back being furnished with inner lid sides to be sealed to the inside surfaces of the outer lid sides, wherein three essentially triangular gussets are provided at each side of the lid top connecting the adjacent edges of the outer lid side, the inner lid sides and the lid top and foldable into a pack lying flat against the inside surface of the lid top.

2. A blank according to claim 1 wherein the said inner lid sides are connected to their adjacent second side panels by weakened lines and wherein the lid skirt includes extensions connected to their respective lid skirts by weakened lines, the said extensions being arranged to be secured to the front panel and to the second side panels in the folded condition of the pack.

3. A blank according to claim 1 including a flap connected to the side of the lid front remote from the lid top and arranged to be folded against the inside of the lid front.

4. A blank according to claim 1 including a neck portion extending from the end of the front panel remote from the base panel providing a neck over which the lid skirt closes in the folded condition of the blank.

5. A blank according to claim 1, in which each first side panel is divided into lower and upper parts between which the associated second side panel is located in the completed container, the top edge of the lower part being arranged to register with the lower edge of the adjacent lid side.

References Cited

UNITED STATES PATENTS

| | | | |
|---|---|---|---|
| 2,163,828 | 6/1939 | Chalmers | 229—37 |
| 2,565,288 | 8/1951 | Worfford | 229—33 |
| 2,914,234 | 11/1959 | Hazelwood | 229—33 X |

FOREIGN PATENTS

| | | |
|---|---|---|
| 819,205 | 9/1959 | Great Britain. |
| 948,790 | 2/1964 | Great Britain. |

DAVID N. BOCKENEK, *Primary Examiner.*

U.S. Cl. X.R.

229—44